US008554791B1

(12) United States Patent  
Lavin

(10) Patent No.: US 8,554,791 B1  
(45) Date of Patent: Oct. 8, 2013

(54) PERSISTENT FOLDER ASSOCIATIONS FOR PERSONAL INTERNET COMMUNICATOR

(75) Inventor: Jeffrey M. Lavin, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1897 days.

(21) Appl. No.: 11/190,726

(22) Filed: Jul. 26, 2005

(51) Int. Cl.
*G06F 17/30* (2006.01)
*G06F 7/00* (2006.01)

(52) U.S. Cl.
USPC ............ 707/781; 707/783; 726/26; 726/27

(58) Field of Classification Search
USPC ................... 707/200; 715/809, 810, 811
See application file for complete search history.

(56) References Cited

U.S. PATENT DOCUMENTS

| | | | | |
|---|---|---|---|---|
| 5,651,139 | A | 7/1997 | Cripe et al. | 395/490 |
| 5,974,517 | A | 10/1999 | Gaudet | 711/173 |
| 6,466,238 | B1 * | 10/2002 | Berry et al. | 715/847 |
| 6,832,317 | B1 | 12/2004 | Strongin et al. | 713/182 |
| 7,089,502 | B2 * | 8/2006 | Nakajima et al. | 715/777 |
| 2003/0233647 | A1 * | 12/2003 | Blaser et al. | 717/174 |
| 2006/0224602 | A1 * | 10/2006 | Rawat et al. | 707/100 |

OTHER PUBLICATIONS

Pogue, David. "Windows XP Home Edition: The Missing Manual" [online], May 2002, O'Reilly, ISBN 0-596-00260-2 < URL: http://proquest.safaribooksonline.com/0596002602 >, Sections 1.0, 1.1 and 6.5.*

Microsoft Windows Team. "Microsoft® Windows® XP Professional Resource Kit, Second Edition" [online], Jun. 11, 2003, Microsoft Press, ISBN 0-7356-1974-3 < URL: http://proquest.safaribooksonline.com/0735619743 >, Chapter 6, Section: "Managing Documents with Folder Redirection."*

Bott, Ed et al. "Special Edition Using Microsoft® Office 2000" [online], May 7, 1999, Que, ISBN 0-7897-1842-1 < URL: http://proquest.safaribooksonline.com/0789718421 >, Chapter 3, Section: "Choosing a Default Storage Location."*

AMD Geode GX 533@1.1W Processor* Technical Specs, http://www.amd.com/us-en/ConnetivitySolutions/ProductInformation/0..50_2330_9863_9864.00.html, printed Oct. 6, 2005 (1 page).

"AMD Personal Internet Communication (PIC)—Specification," http://www.amdboard.com/pic.html, printed Oct. 6, 2005 (6 pages).

* cited by examiner

*Primary Examiner* — Angelica Ruiz
(74) *Attorney, Agent, or Firm* — Terrile, Cannatti, Chambers & Holland, LLP; Michael Rocco Cannatti

(57) ABSTRACT

In a personal Internet communication device, a system for directing the storage of files uses a file navigation program to control the location of where files may be stored by the user. With the system, attempts to save files by the file navigation program are directed to a predefined or default storage location in a fixed directory structure. All other applications on the person Internet communicator may also be modified to control file save operations. The person Internet communicator is further configured to maintain the file save associations with the predefined or default storage location, even when the user has previously saved files to another location.

19 Claims, 4 Drawing Sheets

PERSISTENT FOLDER ASSOCIATIONS FOR PERSONAL INTERNET COMMUNICATOR

BACKGROUND OF THE INVENTION

1. Field of the Invention

The present invention relates to the field of information processing systems. In one aspect, the present invention relates to a system and method for providing simplified file navigation on computer systems used to communicate over the Internet.

2. Description of the Related Art

Computer systems have attained widespread use for providing information management capability to many segments of today's society. A personal computer system can usually be defined as a microcomputer that includes a system unit having a system processor and associated volatile and non-volatile memory, a display monitor, a keyboard, a fixed disk storage device, an optional removable storage device and an optional printer. These personal computer systems are information processing systems which are designed primarily to give independent computing power to a single user (or a group of users in the case of personal computers which serve as computer server systems) and are inexpensively priced for purchase by individuals or small businesses.

In recent years, there has been significant growth in the use of the personal computers to exchange information over the Internet. With the growth, there are increasingly unsophisticated or first-time computer users who are not familiar with file directory protocols for naming and storing files on the computer system. For example, conventional file directory systems allow the user to store a file in any of a plurality of directories or sub-directories in a memory storage device, such as a hard disk. As a result, inexperienced users can be confused by overly complex directory structures, can forget where the file was stored, or will inadvertently save different file types in different directories without understanding how to retrieve the files.

Consequently, there is a need for a simplified file navigation system for storing and retrieving files. In addition, a significant need exists for preserving the integrity of the operating system and the applications stored on computers. Further limitations and disadvantages of conventional systems will become apparent to one of skill in the art after reviewing the remainder of the present application with reference to the drawings and detailed description which follow.

SUMMARY OF THE INVENTION

The method and apparatus of the present invention provides a simple, intuitive, reliable and stable computing environment for a personal Internet communicator (PIC). In one embodiment, the present invention defines a fixed directory structure wherein user data files (such as documents, pictures and videos) automatically directed to be saved in a predefined directory. In support of the simplified directory structure, applications on the PIC are modified so that the applications always attempt to save files to a predefined or default directory. In embodiments of the present invention where the user is permitted to override the default directory and save to another directory location, there is no memory of the previous store location so that the user is continually directed to the predefined directory. In addition, the fixed directory structure may be locked so that it cannot be moved, renamed or deleted. As a consequence, the fixed directory structure acts as a fundamental starting directory structure for the user.

The objects, advantages and other novel features of the present invention will be apparent to those skilled in the art from the following detailed description when read in conjunction with the appended claims and accompanying drawings.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring or unduly limiting the present invention. Such descriptions and representations are used by those skilled in the art to describe and convey the substance of their work to others skilled in the art. The present invention will now be described with reference to the drawings described below.

Figure 1:
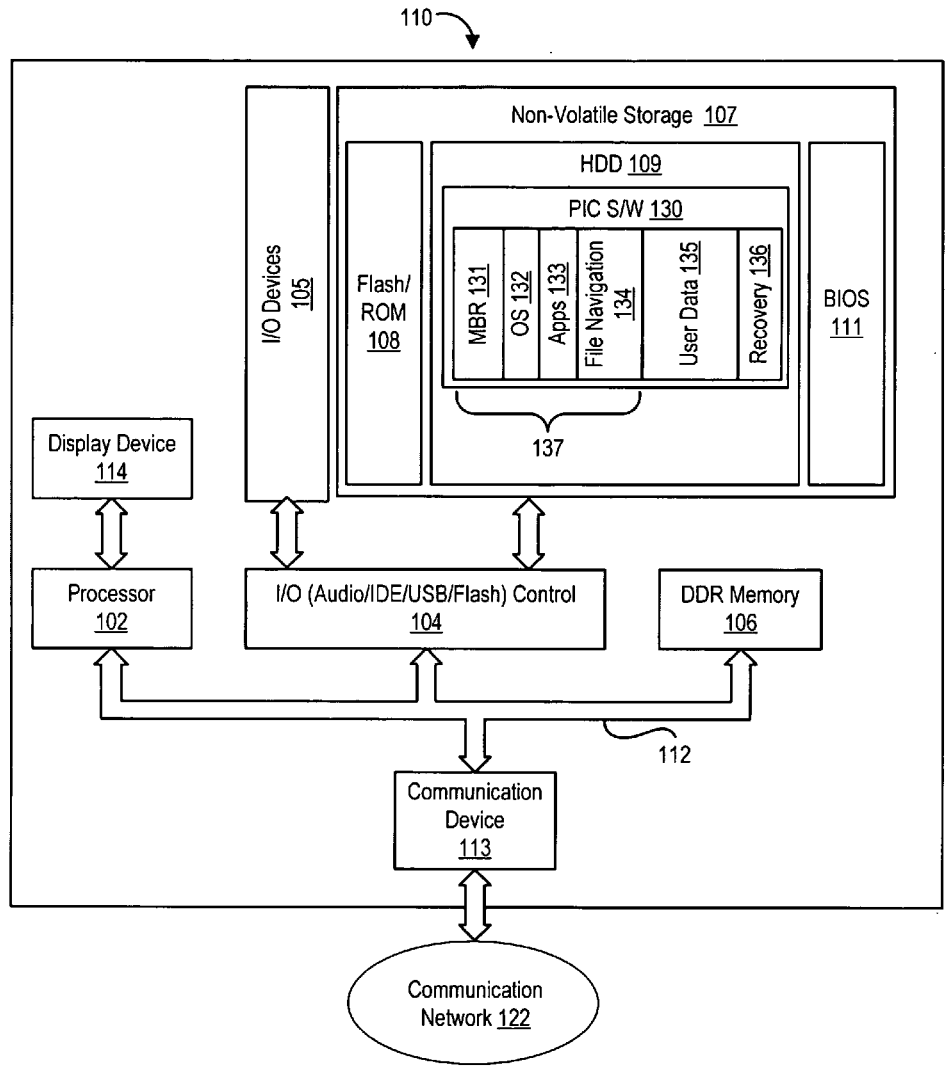
FIG. 1 is a system block diagram of a computer system, such as a personal Internet communicator, in accordance with various embodiments of the present invention.

Referring to FIG. 1, a block diagram of an exemplary computer system 110—also referred to as a multimedia access device or personal Internet communicator (PIC)—is shown. In accordance with a selected embodiment of the present invention, the PIC 110 is designed to be an affordable, easy-to-use and robust consumer device that provides managed Internet access for first-time technology users. To keep the cost affordable and maintain required consumer functionality, a selected embodiment of the PIC 110 includes a monitor or other display device 114 and basic input/output devices 115, such as a USB keyboard and a USB mouse. In addition, ease of use of the PIC 110 is promoted by using preinstalled software with fixed functionality that cannot be upgraded by the user. For example, the preinstalled software may include a basic operating system (such as a the Windows CE operating system) and a suite of productivity tools, including communications applications (such as an Internet browser, e-mail, instant messaging, Macromedia Flash, media player, spreadsheet and word processor), viewer applications (e.g., viewers for PowerPoint, Images and PDF) and print drivers.

Preinstalled software with fixed or reduced functionality improves the first-time user experience by removing complexity from the user's interaction with the PIC 110. To this end, control functionality is included in the PIC 110 to force or direct the user into a predefined directory structure when saving files. For example, the applications that are controlled by the PIC 110 are configured so to always attempt to save files to a specified default directory. In addition or in the alternative, the file navigation capabilities provided to the user are structured to limit or direct file saving to a predetermined location on the hard drive, such as a "My Documents" directory. A user wishing to save a file on the computer system would be directed to save the file based on the type of file being saved. For example, a document or other file generated by a word processing application would be stored in a "Documents" subdirectory of the "My Documents" directory, a picture file would be stored in a "Pictures" subdirectory of the "My Documents" directory, a video file would be stored in a "Music and Video" subdirectory of the "My Documents" directory and downloaded files would be stored in a "My Downloads" subdirectory. The file type may be determined with reference to the file name extension, the type of application that is attempting to save the file or any desired file identification technique.

To implement the control functionality, the PIC 110 includes a processor 102, input/output (I/O) control device 104, memory (including volatile random access memory (RAM) memory 106 and non-volatile memory 107), communication device 113 (such as a modem) and a display 114. The processor 102, I/O controller 104, memory 106 and communication device 113 are interconnected via one or more buses 112. In a selected embodiment, the processor 102 is implemented as an AMD Geode GX 32-bit x86 compatible processor, the memory 106 is implemented as a 128 MB DDR memory and the display 114 is implemented as a CRT monitor. In addition, the non-volatile memory 107 may include a hard disk drive 109 that is implemented as an integrated 3.5 inch hard disk drive with a minimum capacity of, e.g., 10 GB. Either or both of the memories 106, 107 may be integrated with or external to the PIC 110. As for the communication device 113, an integrated 56K ITU v. 92 Modem with an external connector may be used to support different phone systems throughout the world, though other modems (e.g., a soft modem) may also be used. Of course, it will be appreciated that other device configurations may also be used for the processor 102, memory 106, 107, display 114 and communication device 113. For clarity and ease of understanding, not all of the elements making up the PIC 110 are described in detail. Such details are well known to those of ordinary skill in the art, and may vary based on the particular computer vendor and microprocessor type. Moreover, the PIC 110 may include other buses, devices, and/or subsystems, depending on the implementation desired. For example, the PIC 110 may include caches, modems, parallel or serial interfaces, SCSI interfaces, network interface cards, and the like.

As illustrated in FIG. 1, the I/O control device 104 is coupled to I/O devices 105, such as one or more USB ports, a keyboard, a mouse, audio speakers, etc. The I/O control device 104 is also coupled to non-volatile storage 107, such as a flash memory or other read only memory (ROM) 108 and/or hard disk drive 109. The PIC 110 may be connected to a communication network 122, such as the Internet, by a communication device 113, such as a modem, but the connection may be established by any desired network communication device known to those of skill in the art. Though the processor 102 is shown as being coupled directly to a display device 114, the processor may also be coupled indirectly to the display 114 through a display or I/O controller device. Similarly, the processor is shown as being coupled through the I/O controller 104 to the non-volatile memory 107, though direct coupling is also contemplated.

Various programming codes and software are stored in the PIC memory. For example, the basic input/output system (BIOS) code that starts the PIC 110 at startup may be stored in a BIOS ROM device 111 of the non-volatile storage 107, such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS. The BIOS/Bootloader 111 is essentially invisible to the user and includes a compatible bootloader to enable the PIC operating system to be an embedded closed operating system, such as a Windows CE type operating system, though any operating system (including but not limited to Windows-based and Linux-based Operating Systems) could be supported by the BIOS code. The BIOS/Bootloader 111 is essentially invisible to the user and boots to the operating system.

PIC software 130 and user data may also be stored on the hard drive 109 of the non-volatile storage 107 and executed and/or processed by processor 102. The PIC software 130 may include a master boot record (MBR) 131, an operating system 132, application program(s) 133, user data 135, and a hidden image recovery module 136. The MBR 131 is a small program that is executed when the PIC 110 boots up, and typically resides on the first sector of the hard disk 109. In addition, the MBR 131 may contain a table of partitions on the disk (including the system partition and the user partition). As for the operating system 132, several uniquely configurable operating parameters that can affect the performance of the system are pre-configured as part of the software 130 when it is initially installed on the drive 109. The software 130 also includes application programs 133 that are needed for the PIC 110 to function as specified. For example, the applications 133 may include web browser, Flash player, presentation viewer for PowerPoint, chat, game, compression utility, e-mail, word processor, spreadsheet, PDF viewer, media player and/or drawing applications. In addition, the user data 135 stores all of the user's data so that a user has direct access to the user data. This user data is protected from the rest of the operating system to prevent corruption of the data by a virus or other means.

In accordance with the present invention, a simplified user interface is provided for storing and retrieving files by including a file navigation program 134 in the PIC software 130 that controls or directs the user's activities to a predetermined or fixed directory structure. For example, the file navigation program 134 may direct or force a user to save files in a predefined directory structure, such as the "My Documents" directory that is included in the user data partition 135, based on an assessment of that file type. In addition, the applications 133 on the PIC 110 may be modified so that they will always attempt to save files to a specified default directory.

There may be instances where the user should be allowed to save files outside of the fixed directory structure, particularly when the experience and sophistication of the user increases. To accommodate this possibility, the file navigation program 134 and/or applications 133 may be implemented so that the user can override the default save location and save a file to another directory location. However, a selected embodiment of the present invention discourages save operations outside of the fixed directory structure. For example, the operating system 132 and/or file navigation program 134 has no memory of a previous store location or of any store location that is outside of the fixed directory structure. Alternatively, a shell or lock filter (not shown) may be provided to hide any files that are stored outside of the fixed directory structure, or to prevent such files from being renamed or deleted. In this way, the file save associations with the predefined or default storage location is maintained, even when the user has previously saved files to another location.

File storage control may also be provided outside of the file navigation program module 134 to restrict or direct the ability of a user to store files on the PIC 110. In one embodiment, applications that do not use the file navigation program module 134 to save files can instead use an application program interface (API) which causes an application to limit or direct save operations to the predefined directory location. For example, the Save and Save As control functions within an application control structure are defined to store files in the predefined storage location, such as the "My Documents" directory.

Figure 2:
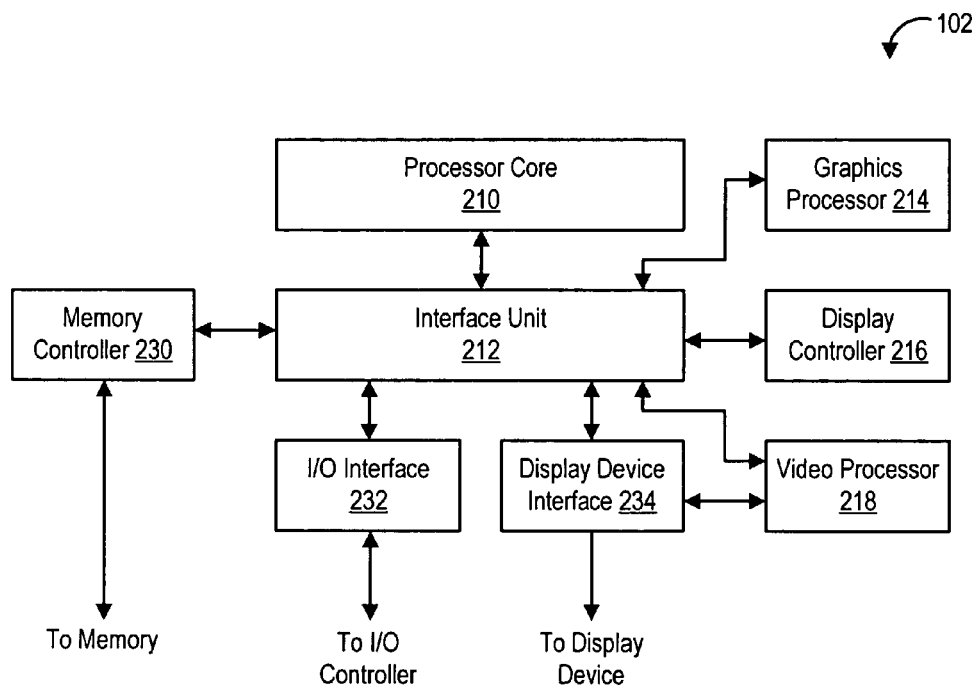
FIG. 2 shows a block diagram of a processor system for use in the personal Internet communicator.

Referring to FIG. 2, a block diagram is shown of the processor 102 that is used to execute the file navigation program module 134. In one embodiment, the processor 102 is a Geode GX2 processor available from Advanced Micro Devices. The processor 102 includes a processor core 210, a bus or interface unit 212, a graphics processor 214, a display controller 216, and a video processor 218. The processor 102 also includes a memory controller 230, an I/O controller interface 232 and a display device interface 234, though it will be appreciated that these controllers and interfaces may be implemented externally to the processor 102. In the illustrated embodiment, the processor 102 executes software stored in the memory 106, 107 to direct the storage of document, picture and video files to an appropriate location in a predefined directory structure.

Figure 3:
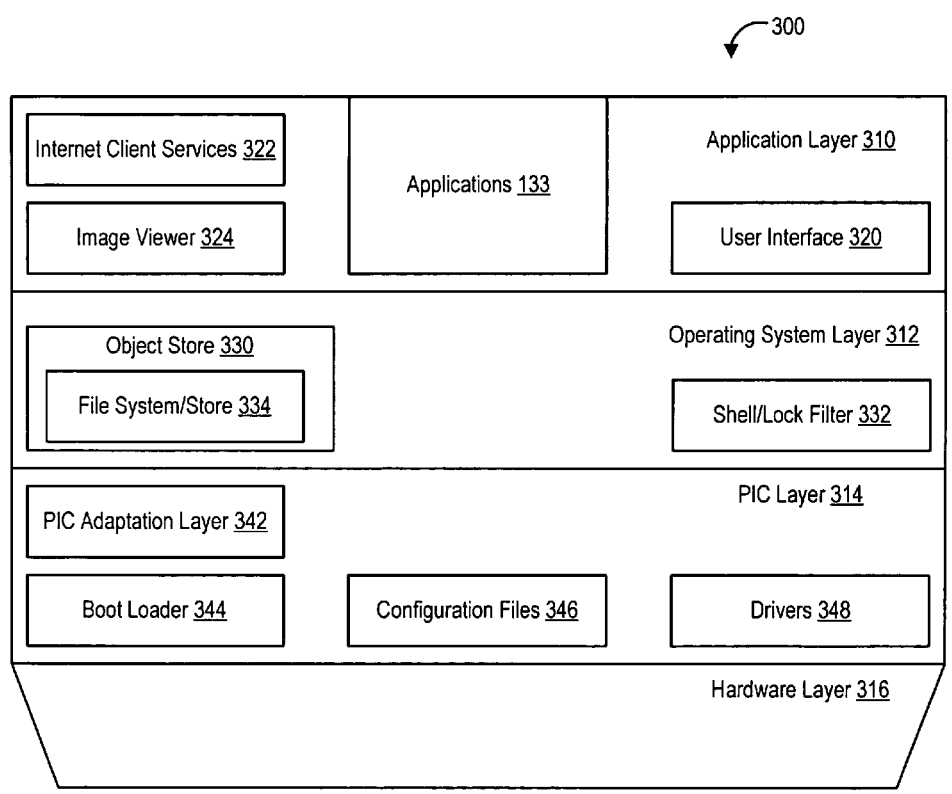
FIG. 3 shows a block diagram of an operating system architecture in which a configurable filter program module is provided for use in a computer system, such as a personal interne communicator.

Referring to FIG. 3, a block diagram is shown of an operating system architecture 300 in which a fixed directory structure is provided for use in a computer system, such as a personal Internet communicator. The operating system architecture 300 includes an application layer 310, an operating system layer 312, a PIC layer 314 and a hardware layer 316.

The application layer 310 includes one or more applications 133, a user interface module 320, an Internet client services module 322 and an image viewer module 324. The applications 133 include the communications applications which may be accessed by the viewer applications, such as the image viewer application 324. Each application 133 may be modified to support save operations to only predefined directory locations in order to simplify file navigation. As for the Internet client services module 322, this module provides Internet communication functionality to the PIC. Lastly, the user interface 320 controls the input and output functions for the display, keyboard, mouse and other input/output functions.

The operating system layer 312 includes an object store module 330 and a shell/lock filter module 332. The operating system layer 312 includes code for providing a plurality of operating system functions such as multimedia functions, graphic windowing and event system functions, device manager functions and communication services and networking functions. The operating system layer 312 also includes code for providing a core dynamic link library (DLL) functionality. The object store module 330 includes the file system and data store module 334 for the operating system. The file system and data store module 334 provides persistent storage for applications and their related data even when the PIC is not powered on, and also directs all store operations for user data to a predefined directory structure. The object store 330 integrates read-only files that are stored in a ROM with read and write files of both an application and a user. The data store within the object store module 330 provides storage, access and sorting of property set records. The object store module 330 also includes the system registry which stores data about applications, drivers, user preferences and other configuration settings.

The shell/lock filter module 332 interacts with any application that explores content within the PIC 110. The shell/lock filter module 332 ensures that a user cannot delete protected or non-user content by identifying which directories are visible or accessible to a user when exploring content stored on the HDD 109 of the PIC 110, and then limiting the user's control functionality so that any visible, protected content is not delectable by the user. So for example, a user might be able to see a list of favorites as provided within a web browser, but would not be able to delete the favorites list, though the favorites list could otherwise be accessible for use. Alternatively, applications 133 that do not use the shell/lock filter module 332 can instead access content via a predefine application program interface (API) that causes the application to adhere to the distinction between protected content and unprotected content (e.g., user data), so that only unprotected content may be deleted.

The PIC layer 314 includes a PIC adaptation layer module 342, a boot loader module 344, a configuration files module 346 and a driver module 348. The PIC adaptation layer module 342 provides a layer of code that logically resides between the operating system layer 312 and the hardware 316 of the PIC 110. The PIC adaptation layer module 342 is linked with kernel libraries to create a kernel executable file. The PIC adaptation layer module 342 facilitates communication between the operating system layer 312 and the hardware of the PIC 110. The PIC adaptation layer 342 includes code to handle interrupts, times, power management, bus abstraction, generic Input/Output ConTroL codes (IOCTLs), etc.

Figure 4:
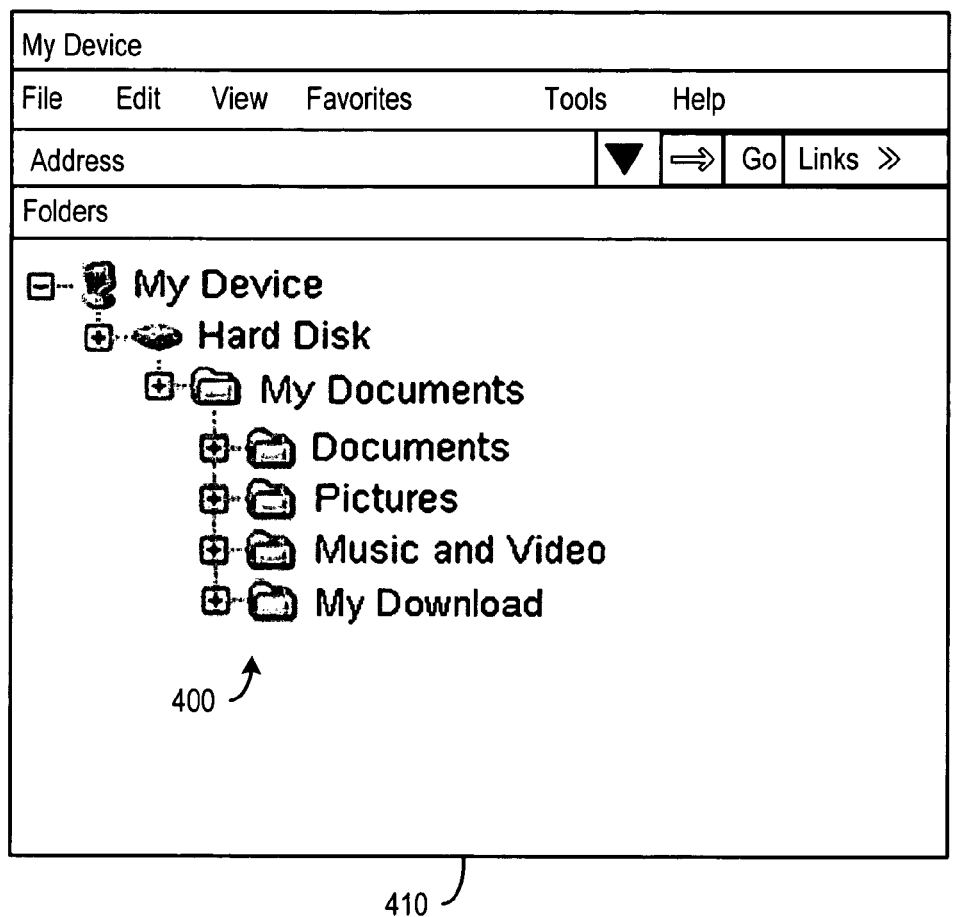
FIG. 4 shows an example fixed directory structure for storing user files as displayed in a display window.

FIG. 4 shows an example fixed directory structure 400 for storing user files as displayed in a display window 410. In the depicted example, user data or other files generated by the applications may be saved under a default directory (My Documents) on the hard disk. Depending on the type of file being stored, the file may be stored in one or more subdirectories. For example, word processing files may be stored under the "Documents" sub-directory, image files may be stored under the "Pictures" sub-directory, music files may be stored under the "Music and Video" sub-directory and downloaded files may be stored under the "My Downloads" sub-directory. As will be appreciated, other sub-directories and sub-sub-directories may also be created under the "My Documents" folder by the user. By directing all user save operations to the fixed directory structure 400, an intuitive and simplified file storage and retrieval protocol is obtained.

The embodiments described herein refer to software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs, CD-Rs, or DVDs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for controlling the ability of a user to save files on a computer system, comprising:
providing the computer system with fixed directory structure for storing user data files; and
configuring an operating system for the computer system so that any file storage by the user is first directed to the fixed directory structure, where the operating system comprises a shell filter module that prevents any file stored outside of the fixed directory structure from being renamed or deleted by hiding any files stored outside of the fixed directory structure.

2. The method of claim 1, wherein the operating system comprises a file navigation module that confines any file save operations by the user to the fixed directory structure.

3. The method of claim 1, wherein the fixed directory structure comprises a first directory and a plurality of sub-directories.

4. The method of claim 3, wherein the file storage in the fixed directory structure is based upon the type of file being saved.

5. The method of claim 1, further comprising configuring a first application on the computer system to store files in the fixed directory structure.

6. The method of claim 1, wherein file storage continues to be directed to the fixed directory structure, even when the user has previously saved files to a location outside of the fixed directory structure.

7. The method of claim 1, wherein the fixed directory structure comprises a "My Documents" directory.

8. The method of claim 1, wherein the fixed directory structure comprises a "My Documents" directory and a plurality of subdirectories, including a "Documents" directory, a "Pictures" directory and a "Music and Video" directory.

9. A device comprising at least one storage device having stored thereon executable instructions and data which, when executed by at least one processing device, cause the at least one processing device to:
detect a request from a user to save a file; and
issue a direction to the user so that any file save operation by the user is first directed to a predetermined location in a fixed directory structure, where the executable instructions and data comprise a shell filter module that prevents any file saved outside of the fixed directory structure from being renamed or deleted by hiding any files stored outside of the fixed directory structure.

10. The device of claim 9, where the fixed directory structure comprises a first directory and a plurality of sub-directories.

11. The device of claim 9, where the predetermined location where a file is saved depends on the type of file being saved.

12. The device of claim 9, where the executable instructions and data further cause the at least one processing device to save the file at a user-selected location if the user overrides the direction to save the file at the predetermined location.

13. The device of claim 9, where a display window is used to issue the direction to save the file at the predetermined location.

14. The device of claim 9, wherein the fixed directory structure comprises a "My Documents" directory.

15. The device of claim 9, wherein the fixed directory structure comprises a "Documents" directory for document files, a "Pictures" directory for picture files and a "Music and Video" directory for music and video files.

16. The device of claim 9, wherein the executable instructions and data continue to direct the user to save files at the predetermined location in the fixed directory structure, even when the user has previously saved files to a location outside of the fixed directory structure.

17. A computer system with persistent folder associations, comprising:
a processor; and
a memory coupled to the processor for storing an operating system to cause the processor to always first attempt to store a file at a predetermined location in a fixed directory structure in response to a user request to save the file, where the operating system comprises a shell filter module that prevents any file stored outside of the fixed directory structure from being renamed or deleted.

18. The computer system of claim 17, wherein the fixed directory structure comprises a "My Documents" directory and a plurality of subdirectories, comprising a "Documents" directory, a "Pictures" directory and a "Music and Video" directory.

19. The computer system of claim 17, where the memory further stores instructions which allow the user to store a file at a user-selected location in response to a user request to save the file at a different location from the predetermined location in the fixed directory structure.

* * * * *